United States Patent [19]

Tondato

[11] Patent Number: 4,756,516

[45] Date of Patent: Jul. 12, 1988

[54] RESILIENTLY DEFORMABLE ELEMENT USABLE AS AN END STOP IN A MOTOR VEHICLE SUSPENSION

[75] Inventor: Carlo F. Tondato, Turin, Italy

[73] Assignee: Polipren S. r. I., Turin, Italy

[21] Appl. No.: 840,417

[22] Filed: Mar. 14, 1986

[30] Foreign Application Priority Data

Mar. 19, 1985 [IT] Italy ............................. 53145/85[U]

[51] Int. Cl.$^4$ ............................................. F16F 1/44
[52] U.S. Cl. ..................................... 267/153; 267/220
[58] Field of Search ............... 267/8 R, 35, 153, 220; 280/668

[56] References Cited

U.S. PATENT DOCUMENTS

| | | | |
|---|---|---|---|
| 2,981,534 | 4/1961 | Peras | 267/35 X |
| 4,474,363 | 10/1984 | Numazawa et al. | 280/668 X |
| 4,478,396 | 10/1984 | Kawaura | 280/668 X |
| 4,486,028 | 12/1984 | Tanahashi | 280/668 |

Primary Examiner—Duane A. Reger
Attorney, Agent, or Firm—Omri M. Behr

[57] ABSTRACT

A resiliently deformable element of elastomeric material having a microcellular structure, suitable for use as an end stop in a motor vehicle suspension comprises a tubular body having a first portion with right circular cylindrical external and internal surfaces and a second portion, coaxial with the first, defined by internal and external conical surfaces converging towards one another away from the first portion. When used in a motor vehicle suspension of the MacPherson strut type the end stop is positioned with the more easily deformed conically tapering second portion defined by the surfaces facing towards the body of a shock absorber, with the rod of the shock absorber passing through the bore in the cylindrical first part of the body. At the junction between the first part and the second part of the body the junction line is defined by an annular groove which assists in the regular deformation of the body in use.

9 Claims, 2 Drawing Sheets

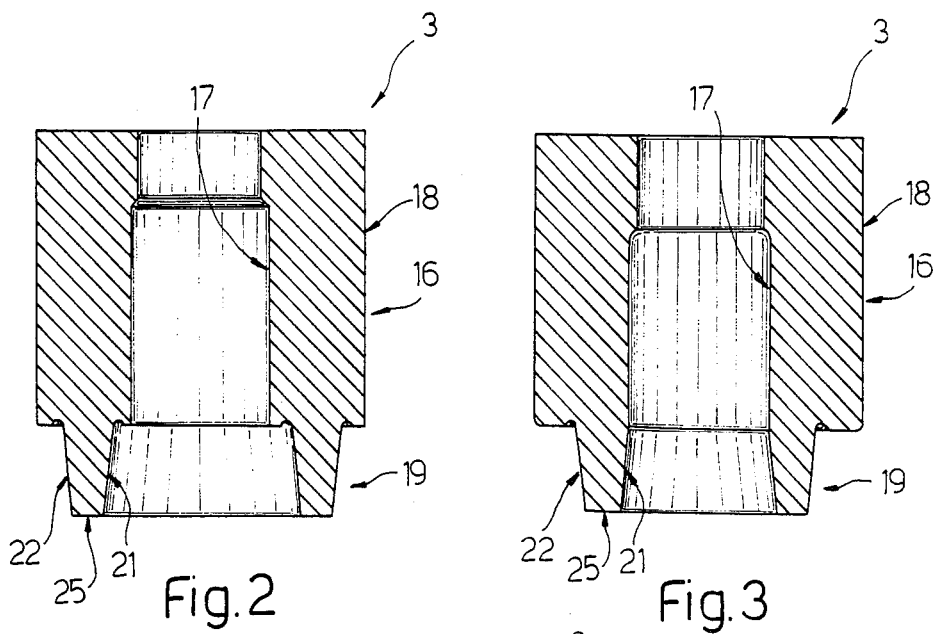
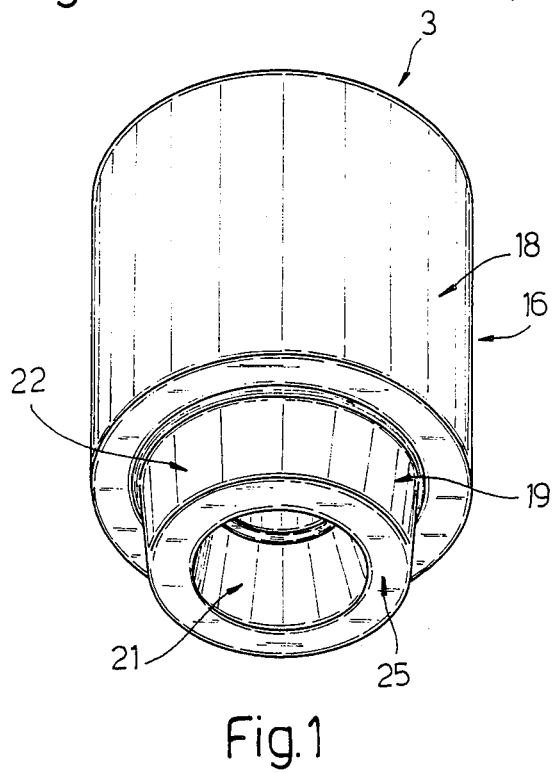
Fig. 2　Fig. 3
Fig. 1

RESILIENTLY DEFORMABLE ELEMENT USABLE AS AN END STOP IN A MOTOR VEHICLE SUSPENSION

BACKGROUND OF THE INVENTION

The present invention relates to a resiliently deformable element made of an elastomeric material having a microcellular structure, which can be used as an end stop in a motor vehicle suspension, in particular a suspension of the Mac Pherson type.

As is known, suspensions of this type substantially comprise a shock absorber the casing of which is pivoted to an axle or a half-shaft of the motor vehicle and the rod of which is pivoted to a suitable part of the motor vehicle body itself; a coil spring, coaxial with the shock absorber, is interposed between this and the body and has a lower end which rests on a suitable shoulder rigidly connected to the casing of the shock absorber and an upper end which rests against a seating of the motor vehicle body. In suspensions of this type a resiliently deformable element is also normally inserted, the functions of which are those of constituting an end stop to the deformation of the suspension and also a true and proper resilient element, at least during a part of the deformation of the supsension itself.

Deformable elements of this type normally have a tubular form and therefore have an axial hole through which passes the rod of the shock absorber an upper end of which is able to engage on a suitable seating in the body and a lower end against which a surface of the casing of the shock absorber comes into contact during operation of the suspension.

It has been found that for a correct operation of suspensions of this type the overall resilient characteristic of the suspension itself, that is to say the variation of the force transmitted through it in dependence of the axial deformation, must, in a first section, be substantially rectilinear and, in a second section, not linear but with a rigidity which increases with an increase in the deformation; it has in fact been found that such variation there is contemporaneously obtained a greater comfort of ride, a better road holding and a more marked resilient return of the suspension.

Since the deformable elements first described, as well as constituting end stops to the deformation of the suspension, constitute true and proper resilient elements along with the springs of the suspension itself, their resilient characteristic (variation of the axial force exerted by them in dependence on their deformation) must be defined in a rigorous manner. It has in fact been found that deformable elements particular suitable for this purpose have a non-linear characteristic substantially comprising a first section of lower rigidity and a second section of higher rigidity than that of the preceding section, separated by a somewhat marked knee. Characteristics of this type can be obtained only with deformable elements having a very complex form; in fact, a deformable element which has been proposed for this purpose has a first part substantially in the form of a sleeve and a second part which extends from the first part and which is shaped in the form of a bellows. In this way the two parts have a differentiated rigidity and, therefore, during a first part of the deformation of the suspension only the second part of the deformable element is active, this having a smaller rigidity, while in the remaining part of the deformation the part with a higher rigidity is active.

Deformable elements of the type described above have various disadvantages.

First of all, because of their complex form, their manufacture is difficult and requires complex and expensive tooling; such deformable elements in fact have numerous overhangs which make their extraction from the forming moulds particularly difficult; also, because of the geometric complexity the time required for their removal from the mould is particularly long.

Finally, the bending forces due to the bellows-type geometry create critical zones which can reduce the resistance to fatigue; in fact, several parts of the deformable element of the above-indicated type work in flexure and therefore, in these parts, rupture by fatigue can easily occur.

SUMMARY OF THE INVENTION

The object of the present invention is that of providing a deformable element of the above-indicated type which will be free from the described disadvantages and, therefore, will be constructionally very simple, can be produced at low cost and without the use of complex tooling, and will have a pratically unlimited durability.

According to the present invention there is provided a resiliently deformable element made of elastomeric material having a microcellular structure which can be used as an end stop in a motor vehicle suspension, the said element having a tubular from and an axial hole through which passes the rod of a shock absorber, an upper end adapted to engage a suitable seating of the motor vehicle body and a lower end contacted in use by a surface of the shock absorber casing, characterized by the fact that it includes a first part which is delimited internally and externally by coaxial surfaces and a second part of annular form coaxial with the first part and which projects axially therefrom, the area of any section of the said second part taken on a plane orthogonal to the longitudinal axis of the element being less than half the cross sectional area of the said first part taken on any such plane, and the axial length of the said second part being less than that of the said first part.

BRIEF DESCRIPTION OF THE DRAWINGS

For a better understanding of the present invention a more detailed description of it will now be given, by way of example, with reference to the attached drawings, in which:

FIG. 1 is a perspective view of the deformable element of the invention;

FIGS. 2 and 3 are axial sections of deformable elements of the invention in two different embodiments;

DETAILED DESCRIPTION OF THE INVENTION

Figure 4:
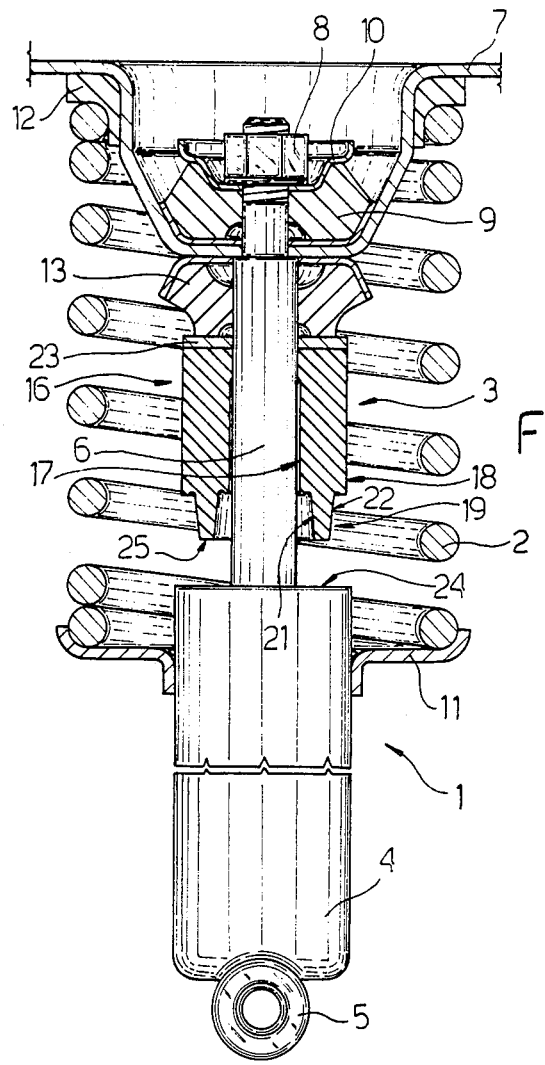
FIG. 4 schematically represents a section of a suspension on which the deformable element of the invention is utilised.

The deformable element of the invention is adapted to be mounted on a motor vehicle suspension of a type such as that illustrated in FIG. 4 (Mac Pherson), substantially comprising a shock absorber 1, a coil spring 2 coaxial with it and the deformable element itself, indicated with the reference numeral 3. The lower end of the casing 4 of the shock absorber 1 is pivoted by means of the collar 5 to an axle or a half-shaft of the motor vehicle, while the upper end of the rod 6 of the shock absorber is pivoted to the motor vehicle body 7; the connection between this end and the motor vehicle body can be made with connection means as illustrated in FIG. 4 and comprising a nut 8 screwed to a threaded end of the rod and an annular rubber bearing block 9 interposed between a washer 10, against which the nut engages, and the motor vehicle body 7.

The coil spring 2 has a lower end, which engages against a collar 11 rigidly connected to the casing 4 of the shock absorber 1, and an upper end which contacts the motor vehicle body 7 through a ring 12.

The deformable element 3 of the invention, which is substantially of tubular form, is traversed by the rod 6 of the shock absorber and its upper end engages on another annular rubber bearing block 13 with the interposition of a plate 23. The axial length of the deformable element 3 is chosen in such a way that the lower end thereof will not be in contact with the casing 4 of the shock absorber when the suspension is in its rest position, but is located at a certain distance from the casing itself as is clearly seen in FIG. 4.

As can be seen from Figures from 1 to 3, the deformable element has a first part 16 which is delimited internally and externally by coaxial cylindrical surfaces 17 and 18 respectively, and a second part 19 of annular form, coaxial with the preceding part, which projects axially therefrom. The area of any cross section of the second part 19 taken on a plane orthogonal to the longitudinal axis of the element is less than half the area of the cross section of the first part 16 taken on any such plane; moreover the axial length of the second part 19 is less than that of the first, 16. The second part 19 is delimited internally and externally by surfaces of any form, but conveniently these are conical surfaces, an internal surface 21 and an external surface 22, which are convergent towards the outer part of the element. In the embodiment of FIG. 2 the smaller diameter of the conical surface 21 which delimits the second part 19 internally is greater than the diameter of the cylindrical surface 17 which internally delimits the first part 18, while the greatest diameter of the conical surface 22 which externally delimits this second part is less than the diameter of the cylindrical surface 18 which externally delimits the said first part.

In the embodiment of FIG. 3, the smaller diameter of the conical surface 21 which internally delimits the second part 19 is substantially equal to the diameter of the cylindrical surface 17 which internally delimits the first part 16.

At the sections which separate the second part 19 from the first part 16 there are formed wide junctions which can be seen in FIGS. 2 and 3, the function of which is substantially that of rendering the deformation of the element more regular in a manner which will be explained hereinbelow.

The deformable element of the invention is made of an elastomeric material having a microcellular structure, that is to say comprising closed and open cells of extremely small dimensions; conveniently such elastomeric material is a polyurethane or a rubber. The element is made by means of the usual forming technologies for microcellular materials, utilising moulds able to form such an element.

The element of the invention is mounted on the suspension in a manner which can be seen in FIG. 1, that is to say by introducing the rod 6 of the shock absorber of the suspension into the interior of the hole in the element itself and bringing the upper end of this into contact with the annular bearing 13, with the interposition of the plate 23; the lower end of the element is, on the other hand, at a predetermined distance from the upper annular surface 24 of the casing 4 of the shock absorber as can be seen clearly in FIG. 4.

The operation of a suspension in which the deformable element of the invention is fitted is as follows.

Figure 5:
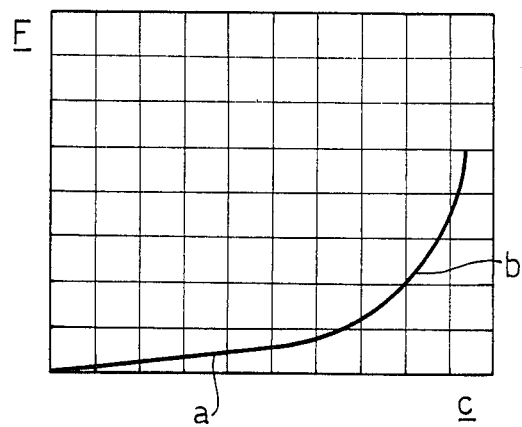
FIG. 5 is a resilient characteristic of a suspension with the deformable element of the invention.

During running of the vehicle the forces acting on an axle or on a half-shaft are transmitted, through the collar 5, to the casing 4 of the shock absorber 2 and from this to the body via the coil spring 2 and the stem 6 of the shock absorber itself. During the first part of the deformation of the suspension only the spring 2 deforms, which has substantially linear characteristic. Therefore, the overall characteristic of the suspension has a rectilinear variation represented by the initial section of the diagram of FIG. 5; in this diagram the variation of the force F transmitted through the element 3 is plotted, by way of example, as a function of the deformation c of the suspension itself.

As soon as the upper surface 24 comes into contact with the surface 25 of the deformable element 3, this latter also contributes to supporting the load which acts on the suspension, together with the spring 2, and therefore the overall characteristic of the suspension now also depends on the characteristic of this element.

During the subsequent deformation of the suspension the deformation of the second part 19 first takes place, the rigidity of this part being less than that of the other part 16. Since the upper surface 24 transmits to the surface 25 pressures which are substantially uniform and orthogonal to this latter surface, the part 19 is stressed substantially in compression and therefore when this part is deformed it is still of annular form and delimited by internal and external surfaces which have diameters which are respectively less than and greater than those of the corresponding surfaces 21 and 22 which delimit the part itself when this is not deformed.

It has been found that the deformation of the second part 19 is more regular when the rounded junctions described above are formed in correspondence with the surface of separation between the first part 16 and the second part 19; such rounded junctions moreover actually constitute starting points for the deformation.

Upon continuing deformation of the suspension, the first part 16 of the deformable element 3 is also deformed which, during the deformation itself works substantially under compression; when this part is deformed it still has an annular form and is delimited externally by a surface which has a diameter greater than that of the cylindrical surface 18 which delimits this part in the undeformed configuration.

It has been found that the characteristic of the element 3 is not linear and has an increasing slope with an increase in the deformation, that is to say the rigidity of this element increases with an increase in the deformation itself.

In particular, the first part of this characteristic, due only to the deformation of the second part 19 of the element, although non-linear, departs only slightly from the rectilinear variation, while the second part of this characteristic due, on the other hand, to the deformation of the first part 16 of the deformable element, has a rigidity which increases rapidly with the deformation. Consequently, the overall characteristic of the suspension is of a type such as that which can be seen in FIG.

5, which comprises, beyond the rectilinear section due, as mentioned above, solely to the deformation of the coil spring 2, the section b having a non rectilinear variation which is joined in a gradual manner with the rectilinear section and which is due above all to the deformation of the deformable element 3. The gradual passage from the rectilinear section to the section b is due above all to the presence of a second part 19 of this deformable element.

It has been found that the deformable element 3 has an almost indefinite life and is not subject to rupture by fatigue; this favourable result depends on the fact that all the material of the deformable element works substantially under compression; in fact, even the second part 19 of this element, while being subjected to very high deformations, works solely under compression as distinct from what took place in deformable elements of the prior art type in which the more deformable parts worked instead in flexure.

The deformable element of the invention can be made very quickly utilising very simple tooling; in fact, being delimited by cylindrical and conical surfaces it does not give rise to overhangs during extraction from the forming moulds; these latter can therefore be made very simple and thus can be produced at low cost and have a considerable working life; finally, since the deformable element does not have parts of very small thickness, the forming process can be effected rapidly and without particular precautions.

It is evident that modifications and variations can be introduced to the form of the deformable element which has been described, without departing from the scope of the invention.

In particular, the two coaxial surfaces 17 and 18 which delimit the first part 16 of the deformable element can have a form different from the cylindrical form described, and may be, for example, conical.

I claim:

1. A resiliently deformable element made of an elastomeric material having a microcellular structure usable as an end stop in a motor vehicle suspension, the said element having a tubular form with an axial hole into which is introduced the rod of a shock absorber, an upper end adapted to engage against a suitable seating of the motor vehicle body and a lower end against which a surface of the casing of the shock absorber contacts in use, characterized by the fact that it includes a first part which is delimited internally and externally by coaxial surfaces and a second part of annular form coaxial with the first part and projecting axially therefrom, the annular area of any section of the said second part taken on a plane orthogonal to the longitudinal axis of the element being less than half the annular area of the section of the said first part taken on any such plane, and the axial length of the said second part being less than that of the said first part, the annular area of any section of said second part taken on a plane orthogonal to the longitudinal axis of the element having: (a) an outside diameter less than or equal to that of said upper end, and (b) an inside diameter greater than or equal to that of said upper end, so that axial compressive force on said element does not cause excessive flexing.

2. A deformable element according to claim 1, characterised by the fact that the said coaxial surfaces are cylindrical surfaces.

3. A deformable element according to claim 1, characterised by the fact that the said second part is delimited internally and externally by conical surfaces which are convergent towards the exterior part of the element.

4. A deformable element according to claim 1, characterised by the fact that the minimum diameter of the said conical surface which internally delimits the said second part is greater than the diameter of the said cylindrical surface which internally delimits the said first part of the maximum diameter of the said conical surface which externally delimits the said second part is less than the diameter of the said cylindrical surface which externally delimits the said first part.

5. A deformable element according to claim 3, characterised by the fact that the smaller diameter of the said conical surface which internally delimits the said second part is substantially equal to the diameter of the said cylindrical surface which internally delimits the said first part and the greater diameter of the said conical surface which externally delimits the said second part is less than the diameter of the said cylindrical surface which externally delimits the said first part.

6. A deformable element according to claim 1, characterised by the fact that rounded connections are formed on the outer surface of the element in corremspondence with the separation section between the said first and second parts.

7. A deformable element according to claim 1, characterised by the fact that the said elastomeric material of microcellular structure is polyurethane.

8. A deformable element according to claim 1, characterised by the fact that the said elastomeric material having a microcellular structure is a rubber.

9. A deformable element according to claim 6 wherein said rounded connections include having a bottom and two sides that diverge from the bottom in the same axially downward direction.

* * * * *